Feb. 14, 1939. J. A. KINNEY 2,146,825
METHOD FOR MANUFACTURING BOLTS AND SIMILAR ARTICLES
Original Filed April 12, 1935
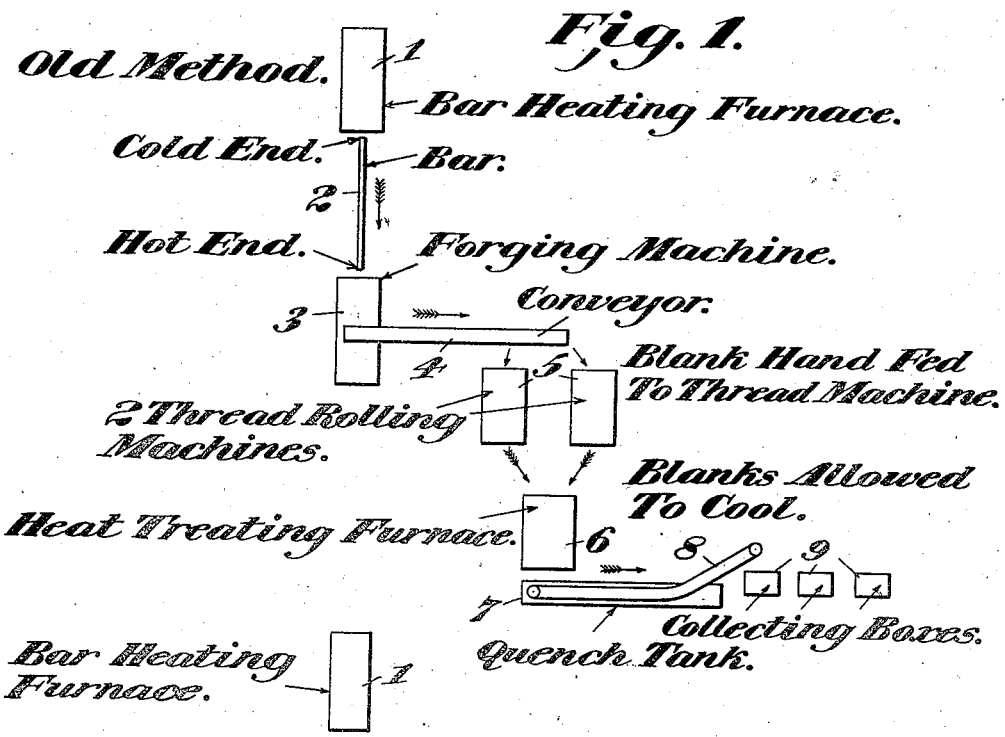
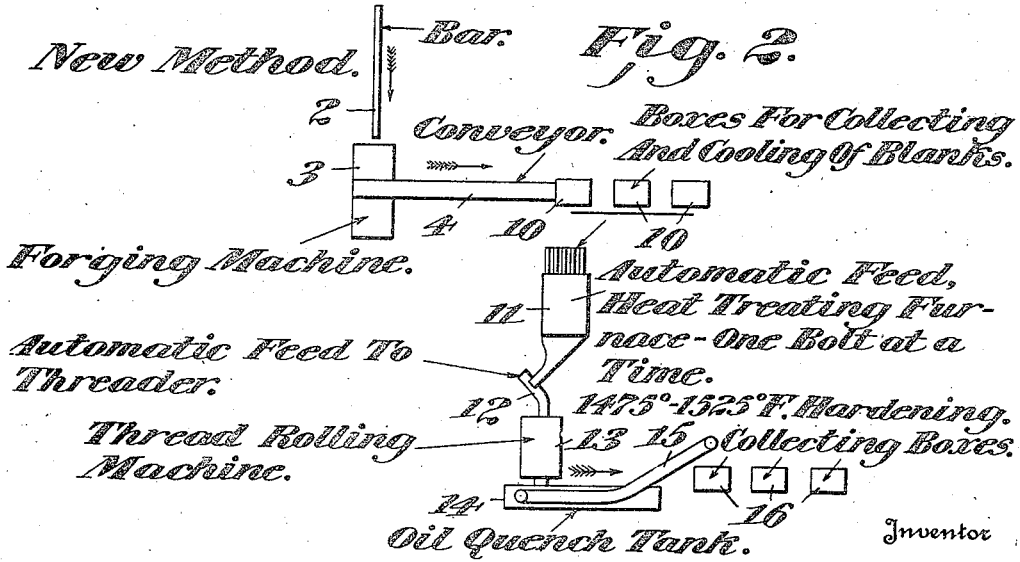

Patented Feb. 14, 1939

2,146,825

UNITED STATES PATENT OFFICE 2,146,825

METHOD FOR MANUFACTURING BOLTS AND SIMILAR ARTICLES

James A. Kinney, Bethlehem, Pa., assignor to Bethlehem Steel Company, a corporation of Pennsylvania Original application April 12, 1935, Serial No. 15,975. Divided and this application March 27, 1937, Serial No. 133,302

14 Claims. (Cl. 10—27)

My invention relates to certain new and useful improvements in a method for manufacturing bolts and similar articles and relates more especially to the treatment of track-bolts during their formation, and is a division of my copending application entitled "Method and apparatus for manufacturing bolts and similar articles", filed April 12, 1935, Serial No. 15,975.

Heretofore in manufacturing track-bolts of this type lengths of bars are heated to a forging temperature in a heating furnace and then fed by the use of tongs from the heating furnace to the feed rolls of a continuous header or forging machine located adjacent to the furnace. The forging machine shears off the bolt-blank lengths, heads them and drops them into a pan type conveyor.

The conveyor delivers the heated blanks to a chute that serves two hot roll threading machines, having an operator for each machine. Each operator procures a supply of heated blanks for his thread rolling machine by opening a trap in the chute operated by a foot treadle. The bolt-blanks are fed by hand to the roll threading machines, and the threads formed thereon, using the forging heat for the bar.

After the threading operation the bolts are allowed to cool and are subsequently delivered by hand to a heat treating furnace, where they are given one treatment which consists in heating the bolts to the critical temperature and finally quenching them in oil.

After the bolts have been formed, heat treated and quenched in oil, they are assembled with nuts and prepared for shipment.

Considerable difficulty is encountered in maintaining proper thread fits by this method of manufacture, as the threads thus formed have varying pitch which necessitate fitting individual nuts to the bolts.

To maintain measurements within the tolerance limits of the American Standards Class II, fit is commercially impractical with this usual method of manufacture.

The proper fit between the nut and bolt is now obtained by tapping the nuts after the bolts have been threaded in order to match as nearly as possible the thread on the bolt. Even then at least three sizes of nut threads are tapped for each run of bolts. The fit is then obtained by the assembler trying different nuts on each bolt until the proper fit has been found.

In extreme cases as many as five different sizes of nut tappings are required for one run or lot of bolts. This is objectionable to the customer and also entails extra expense.

A careful study was made to determine why the bolts finished in this condition. While there are several factors contributing to the variation of thread dimensions, the principal factor is the temperature variation.

In the first place it was found that there is a lack of uniformity of temperature throughout the length of a furnace for heating long bars of this type, and a uniform temperature cannot be maintained from end to end of the bar.

In the second place it was noted that when a new bar is taken from the furnace and fed to the machine the front end of the bar enters the dies of the machine at approximately the same as the furnace temperature, because the time in which it can cool off after leaving the furnace is very small.

As the bar feeds into the forging machine progressively at the rate of about ninety blanks per minute, that portion that moves at this slow rate of speed through the gap between the furnace and forging machine cools down somewhat before it enters the dies.

In the third place, the pans of the conveyor between the forging and threading machines carry some water picked up from the cooling water for the dies of the forging machine.

This water and the sides of the pan conveyor have a chilling effect upon whichever part of the hot blank which happens to touch the same, as a bolt that lies horizontally in the conveyor pan will receive more cooling effect than one that stands head downward with the shank pointing upwardly on the inclined side of the conveyor, with the result that some of the blanks may have hard spots detrimental to the threading operation, and cause unequal cooling and thereby unequal pitch of the thread.

Effect is made to get rid of this water in the pans by perforations, but scale and dirt has a clogging effect so that all the water does not drain off.

In the fourth place in the hand process of feeding bolt-blanks to the roll threaders, the blanks are not picked out of the chute in the same sequence in which the heads are forged and therefore some of them lie in the chute until they have cooled off considerably before the thread rolling operation.

Due to this difference in the temperatures of the blank, some of the threads were rolled while at a good working heat while others were threaded at a lower temperature which caused the blank to stiffen up and produce variable pitch threads.

In the fifth place, it is necessary to use two thread rolling machines to keep up with one forging machine when the heading and threading operations are done in the same heat. Here again is an opportunity for inequalities to occur in the pitch of the threads, because of slight differences in the set-up of the threading dies in the different machines, and also slight differences in the dies themselves. When one of the threading machines is out of production for any cause the forging machine continues to operate, feeding as many blanks to the remaining threader as it will take. The surplus is allowed to get cold and must be re-heated and threaded in a third machine, introducing another die-set-up to add to possibilities of inaccuracy and the additional cost of re-heating.

In the sixth place, the heat treatment following the threading operation causes a scale formation on the thread of varying thickness and non-uniformity. Here again is opportunity for unequal expansion and contraction which may effect the pitch of the thread. All of which defects will be eliminated by my improved method.

I have found by actual experiment that a variation as much as .023 of an inch will occur in the pitch of the thread of a bolt one inch in diameter between the extremes of normal rolling temperatures, and that this variation of the pitch of thread can be held to about .008 of an inch when the thread is rolled at uniform temperatures.

In view of this investigation it was decided in all of these errors, singly or combined were corrected, then threads could be produced on the bolt having uniform pitch and depth would eliminate the objections of the railroads and cut down the manufacturing costs of having to tap an assortment of from three to five nuts having differences in pitch so as to match the differences in pitch of the threads on the various bolts, and having to select a nut to fit a particular bolt. This is a slow and time consuming operation because it must be done by hand.

By my method all the objectional features tending to produce irregularity in thread characteristics are obviated with the result that bolts having uniform threads can be produced which require the tapping of but one size of nuts, thereby the screwing of the nut on the bolt is a simple and speedy operation and a big time saver over the usual method now in use.

In my invention a bar is taken from the furnace which has been heated to the critical point or slightly above the same and fed into the heading or forging machine which cuts the bar into bolt lengths, and then upsets a head on the end of each length in the usual manner. The forged blanks are then picked up by the conveyor and deposited in collecting boxes to cool.

As illustrated and described in my above mentioned copending application Serial No. 15,975, after the blanks have cooled sufficiently to allow handling they are fed manually into a heat treating furnace which advances them in rows in a step-by-step movement throughout the furnace and heats them to at least the critical point or a little above the same which will usually be between 1475° F. to 1525° F. which may vary somewhat depending on the carbon content of the steel used, as the higher the carbon content the lower the temperature required to raise the steel to the critical point. The time consumed for passing the blanks through the furnace is sufficient to bring the bolt-blanks up to this heat, after which they are automatically ejected one at a time from alternate rows and immediately fed into a single thread rolling machine, from which the threaded bolts drop into an oil quenching tank and from which they are removed by an endless conveyor and collected in boxes. The nuts are then screwed on to the bolts to complete the operation for the assembled article.

By this method, it does not matter whether the bolts are all headed from a bar having a hot and cold end because the threading does not follow the head forging operation and in the same heat. The threading operation follows the heating for treatment operation, whereby each separate blank is heated to the same degree of temperature as it is fed to the threading machine. The step of threading the bolt-blanks all at the same temperature after heating for treatment is very important because here the thread is produced practically at the end instead of in the middle of the operation. Threading at this point also presents another distinct advantage, in that threading after the final heating removes the scale on the threaded portion produced by heating before it enters the quenching tank with the result that the finished thread emerges from the tank free from scale and bright and clean.

The water picked up by the conveyor from the forging machine will have no ill effect upon the blanks to be threaded because the blanks are again heated to a uniform temperature before threading, thereby eliminating the unequal cooling effect of the water which affected the pitch of the threads when forging and threading in one heat.

One of the objects of my invention relates to the method of forming bolt-blanks in one heat independent of the heat treating and threading operations.

Another object of the invention relates to the method of heat treating the bolt-blanks.

Another object of my invention relates to my improved method of producing bolts with threads having a uniform pitch.

Another object of my invention relates to my method of heat treating the bolt-blanks in such a manner as to refine the grain of the steel so as to impart greater strength and toughness to the bolts.

A further object of the invention relates to the method of heat treating the bolt-blanks and then automatically advancing them to the thread rolling machine at any desired uniform temperature.

Still another object of my invention relates to the method of heat treating the bolt-blanks, threading the blanks thereby removing the scale from the threaded end of the bolts, and then immediately quenching the bolts in an oil bath.

Other objects of my invention will hereinafter appear.

Having thus given a general description of my invention, I will now in order to make the same more clear, refer to the annexed sheet of drawings forming a part of this specification and in which like characters of reference denote like parts.

Figure 1 is a diagrammatic view illustrating the different steps used in the old or usual method of forming and heat treating track-bolts, and Fig. 2 is a diagrammatic view illustrating the different steps used in my improved or new method of forming and heat treating track-bolts or the like.

Referring now to the various characters of reference on the drawing:

In Fig. 1 which illustrates diagrammatically the steps used in the old or usual method of forming track-bolts, a heating furnace is indicated as 1, in which the bars 2 are heated and advanced to the forging machine 3, which shears the bars 2 into bolt-blank lengths and upsets a head on one end of each of the blanks and deposits them on the conveyor 4. The conveyor delivers the headed blanks to a chute (not shown) from which two operators receive the bolt-blanks and feed them manually to the two thread rolling machines 5, after which the bolt-blanks are allowed to cool. The bolt-blanks are then fed manually to a heat treating furnace 6, where they are heated to a critical temperature and then quenched in a tank 7, from which they are removed by means of an endless conveyor 8, and collected in boxes 9.

In Fig. 2, I have illustrated diagrammatically the steps used in my improved or new method of forming track-bolts, or the like in which the bolt-blank forming operation is the same as in the old or usual method, having the same bar heating furnace 1, for heating the bar 2, forging machine 3, and conveyor 4, which transfers them to the collecting boxes 10, to cool. After the bolt-blanks have cooled sufficiently to be handled, an operator feeds them manually to a heat treating furnace 11, having means for automatically advancing the bolt-blank in a step-by-step movement through the furnace, during which time the bolt-blanks are heated to at least the critical temperature and then ejected into an automatic feed 12, to a single roll threading machine 13, from which they are ejected into the tank 14, and quenched in oil and later removed by means of an endless conveyor 15, and collected in boxes 16, ready to have the nuts assembled thereon before shipment.

Heretofore because of the long time intervals required and the cooling effect of the water used on the dies for forging and roll threading in one heat necessitates that the initial heat of the bar must be 200° to 400° F. higher than the critical range. Therefore the bolt has to be quenched after it has cooled back to the critical range. This does not produce good physical properties, as the grain in this case is very much larger than when the bolt has been brought up to the critical temperature and then quenched without first having been heated several hundred degrees beyond this point and allowed to cool back. By a series of tests I have found that you cannot heat a track-bolt several hundred degrees above the critical temperature, allow it to cool back to that range, then quench, and expect to meet the physical properties that are specified in track-bolt work.

In my method of forming the bolt-blank in one operation and heat treating, threading the blanks in one machine, and quenching them in a separate independent final operation is of great advantage as it enables me to thread the blank and quench them all at a working temperature at approximately the critical point thereby maintaining the pitch of the thread. As the forging and roll threading machines are no longer connected together as a unit, neither will lose production because of the delays in the other.

Although I have shown and described my improvements in considerable detail, I do not wish to be limited to the exact and specific details shown and described, but may use such substitutions, modifications or equivalents thereof, as are embraced within the scope of my invention or as pointed out in the claims.

Having thus described my invention what I claim as new and desire to secure by Letters Patent is:

1. The method of manufacturing bolts or the like, which consists in taking a cold bolt blank previously formed by a hot forging operation, reheating the bolt blank to at least the critical temperature, immediately forming threads thereon by means of suitable dies, and then immersing the bolt in a quenching bath and allowing the bolt while so immersed to cool.

2. The method of manufacturing bolts or the like, which consists in taking a cold bolt blank previously formed in one heat, reheating the bolt blank to between 1475° F. and 1525° F., immediately forming threads thereon by means of suitable dies and then immersing the bolt in a quenching bath and allowing the bolt while so immersed to cool.

3. The method of manufacturing bolts or the like, which consists in taking a cold bolt blank previously formed by a hot forging operation, reheating the bolt blank to slightly above the critical temperature, immediately forming threads thereon by means of suitable dies, and then before its temperature falls below the critical point immersing the bolt in a quenching bath and allowing the bolt while so immersed to cool.

4. The method of manufacturing bolts or the like, which consists in heating a bar to a forging temperature, cutting the bar into bolt-blank lengths, heading the bolt-blank lengths, and then cooling the blanks, reheating the blanks to at least the critical temperature to obtain grain refinement, immediately forming threads thereon by means of suitable dies and then immersing the bolt in a quenching bath and allowing the bolt while so immersed to cool.

5. The method of manufacturing bolts or the like, which consists in heating a bar to a forging temperature, cutting the bar into bolt-blank lengths, heading the bolt-blank lengths and then cooling the blanks, reheating the bolt-blanks to slightly above the critical temperature, immediately forming threads thereon by means of suitable dies, and then before its temperature falls below the critical point immersing the bolt in a quenching bath of oil and allowing the bolt while so immersed to cool.

6. The method of manufacturing bolts or the like, which consists in heating a bar to a forging temperature, cutting the bar into bolt-blank lengths, upsetting heads on each bolt-blank length, and then cooling the blanks, reheating the blanks to between 1475° F. and 1525° F., immediately forming threads thereon by means of suitable dies and immersing the bolts in a quenching bath of oil and allowing the bolts while so immersed to cool.

7. The method of manufacturing bolts or the like, which consists in taking a cold bolt blank previously formed in one heat, reheating the bolt blank to a temperature slightly above the critical point, immediately forming threads thereon by means of suitable dies, thereby removing the scale formed during the heating operation, and then before its temperature falls below the critical point immersing the bolt in a quenching bath of oil and allowing the bolt while so immersed to cool.

8. The method of manufacturing bolts or the like, which consists in forming blanks in one heat and allowing the blanks to cool, then reheating the blanks to a predetermined temperature at least as high as the critical point, immediately forming threads thereon and then immersing the bolts in a quenching bath and allowing the bolts while so immersed to cool.

9. The method of manufacturing bolts or the like, which consists in forming blanks in one heat and allowing the blanks to become cold, then reheating the blanks to a predetermined temperature slightly above the critical point, immediately forming threads thereon, and then before its temperature falls below the critical point immersing the bolts in a quenching bath of oil and allowing the bolts while so immersed to cool.

10. The method of manufacturing bolts or the like, which consists in taking a bar and heating it in a furnace to a forging temperature, cutting the bar into bolt-blank lengths, upsetting a head on one end of each blank and then allowing the blanks to cool, reheating the blanks to a uniform predetermined temperature slightly above the critical point, immediately forming a thread thereon by rolling the blanks between suitable dies, and then before the temperature falls below the critical point immersing the bolts in a quenching bath of oil and allowing the bolts while so immersed to cool.

11. The method of manufacturing bolts or the like, which consists in forming the blanks in one operation, reheating the blanks to a uniform predetermined temperature slightly above the critical point, immediately forming threads thereon at a uniform temperature by rolling the blanks between suitable dies, and then before the temperature falls below the critical point immersing the bolts in a quenching bath of oil and allowing the bolts while so immersed to cool.

12. The method of manufacturing bolts or the like articles, which consists in taking blanks previously formed from stock bars, which were first heated to a forging temperature and cut into blank lengths, then headed and then said blanks allowed to cool, reheating the blanks uniformly to a least the critical temperature whereby a finer grain structure of the steel is produced, immediately forming threads thereon by means of suitable dies, and then immersing the bolts in a quenching bath and allowing the bolts while so immersed to cool.

13. The method of manufacturing bolts or the like articles, which consists in heating a stock bar to the critical point cutting the stock bar into bolt-blank lengths, upsetting a head on each of the bolt-blank lengths, and then quenching the blanks until cool, reheating the blanks to at least the critical temperature, immediately forming threads thereon by means of suitable dies, and then immersing the formed bolts in a quenching bath and allowing the bolts while so immersed to cool.

14. The method of manufacturing bolts or the like articles, which consists in heating a stock bar to slightly above the critical point, cutting the stock bar into bolt-blank lengths, upsetting a head on one end of each of the bolt-blank lengths, and then cooling the blanks, reheating the blanks to slightly above the critical temperature, immediately forming threads thereon by means of suitable dies and then immersing the formed bolts in a quenching bath and allowing the bolts while so immersed to cool.

JAMES A. KINNEY.